(12) United States Patent     (10) Patent No.:   US 12,563,514 B2

Li et al.     (45) Date of Patent:   Feb. 24, 2026

(54) WIRELESS COMMUNICATION METHOD AND TERMINAL DEVICE

(71) Applicant: GUANGDONG OPPO MOBILE TELECOMMUNICATIONS CORP., LTD., Dongguan (CN)

(72) Inventors: Haitao Li, Dongguan (CN); Yi Hu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 322 days.

(21) Appl. No.: 18/213,321

(22) Filed: Jun. 23, 2023

(65) Prior Publication Data

US 2023/0337289 A1     Oct. 19, 2023

Related U.S. Application Data

(63) Continuation of application No. PCT/CN2020/140914, filed on Dec. 29, 2020.

(51) Int. Cl.
*H04W 56/00*     (2009.01)
*H04W 74/00*     (2009.01)
(Continued)

(52) U.S. Cl.
CPC ....... *H04W 56/004* (2013.01); *H04W 74/002* (2013.01); *H04W 74/0833* (2013.01); *H04W 74/0836* (2024.01); *H04W 74/0838* (2024.01)

(58) Field of Classification Search
CPC ............. H04W 56/004; H04W 74/002; H04W 74/004; H04W 74/0833; H04W 74/0836;
(Continued)

(56) References Cited

U.S. PATENT DOCUMENTS

| | | | |
|---|---|---|---|
| 2018/0242354 A1* | 8/2018 | Takeda | .............. H04W 74/0833 |
| 2019/0069258 A1 | 2/2019 | Jeon et al. | |

(Continued)

FOREIGN PATENT DOCUMENTS

| | | |
|---|---|---|
| CN | 111972030 A | 11/2020 |
| CN | 112075107 A | 12/2020 |

(Continued)

OTHER PUBLICATIONS

International Search Report and Written Opinion dated Sep. 18, 2021 in International Application No. PCT/CN2020/140914. English translation attached.

(Continued)

*Primary Examiner* — Mohamed A Kamara

(74) *Attorney, Agent, or Firm* — Sheppard, Mullin, Richter & Hampton LLP

(57) ABSTRACT

Embodiments of the present disclosure provide a wireless communication method and a terminal device. The method includes: determining, by a terminal device, a first offset for a Random Access Response, RAR, window; initiating, by the terminal device, the RAR window after the first offset following transmission of a preamble on a Secondary Cell, SCell; and monitoring, by the terminal device, an RAR in the RAR window on a Primary Cell, PCell, or a Primary SCell, PSCell.

16 Claims, 7 Drawing Sheets

(51) Int. Cl.
   *H04W 74/0833*    (2024.01)
   *H04W 74/0836*    (2024.01)
   *H04W 74/0838*    (2024.01)

(58) Field of Classification Search
   CPC ......... H04W 74/0838; H04W 56/0045; H04W
                    84/06; H04B 7/18515
   See application file for complete search history.

(56) References Cited

U.S. PATENT DOCUMENTS

| | | | | |
|---|---|---|---|---|
| 2021/0251012 A1* | 8/2021 | Shrestha | ........... | H04W 56/0045 |
| 2023/0100364 A1* | 3/2023 | Liberg | ................ | H04W 74/002 |
| | | | | 370/329 |
| 2023/0156804 A1* | 5/2023 | Ye | ...................... | H04B 7/18563 |
| | | | | 370/329 |

FOREIGN PATENT DOCUMENTS

| | | | |
|---|---|---|---|
| WO | 2017194018 A1 | 11/2017 | |
| WO | 2018196092 A1 | 11/2018 | |
| WO | 112075118 A | 12/2020 | |

OTHER PUBLICATIONS

"3rd Generation Partnership Project; Technical Specification Group Radio Access Network; Solutions for NR to support non-terrestrial networks (NTN) (Release 16)" 3GPP TR 38.821 V1.0.0, Dec. 6, 2019, section 7.2.1.1.1.2.
Extended European Search Report dated Jan. 4, 2024 received in European Patent Application No. EP20967418.3.
"3rd Generation Partnership Project; Technical Specification Group Radio Access Network; Solutions for NR to support non-terrestrial networks(NTN)(Release 16)" 3GPP Standard:Technical Report: 3GPP TR 38.821.3rd Generation Partnership Project (3GPP)Mobile Competence Centre :65Route Des Lucioles : F-06921 Sophia-Antipolis Cedex:France,vol. RAN WG3,No. V0.9.0 Nov. 18, 2019 (Nov. 18, 2019), pp. 1-114,XP051840615.
Samsung:"RACH Aspects for CA and DC"3GPP Draft:R1-1714491,3rd Generation Partnership Project(3GPP),Mobile Competence Centre :650Route Des Lucioles :F-06921 Sophia-Antipolis Cedex:France vol. RAN WG1,No. Prague, Czech Republic; Aug. 21, 2017-Aug. 25, 2017,Aug. 20, 2017(Aug. 20, 2017), XP051317267.

* cited by examiner

Carrier Aggregation of two component
carriers, occupying 40MHz bandwith

Carrier Aggregation of five component
carriers, occuping100MHz bandwidth

200

300

400

WIRELESS COMMUNICATION METHOD AND TERMINAL DEVICE

CROSS-REFERENCE TO RELATED APPLICATION

This application is a continuation of International Application No. PCT/CN2020/140914 filed on Dec. 29, 2020, the entire disclosure of which is incorporated herein by reference.

FIELD

The present disclosure relates to the field of communications, and more particularly, to a wireless communication method and a terminal device.

BACKGROUND

In a New Radio (NR) system, a Non-Terrestrial Network (NTN) is considered to be used to provide communication service to users.

After the introduction of the NTN, an NTN cell can also be considered for Carrier Aggregation (CA) technology and Dual Connectivity (DC) technology. However, due to a great distance between a satellite and the ground in the NTN, there is also a great signal transmission delay between the terminal device and the satellite. As a result, the terminal device cannot use the random access mode for a Terrestrial Network (TN) to access the NTN cell. Therefore, how to realize random access to the NTN cell is an urgent problem to be solved.

SUMMARY

Embodiments of the present disclosure provide a wireless communication method and a terminal device.

In a first aspect, a wireless communication method is provided. The method includes: determining, by a terminal device, a first offset for a Random Access Response, RAR, window; initiating, by the terminal device, the RAR window after the first offset following transmission of a preamble on a Secondary Cell, SCell; and monitoring, by the terminal device, an RAR in the RAR window on a Primary Cell, PCell, or a Primary SCell, PSCell.

In a second aspect, a terminal device is provided. The terminal device includes a processor and a memory. The memory is configured to store a computer program, and the processor is configured to invoke and execute the computer program stored in the memory to perform the method according to the first aspect or each of various implementations thereof.

DETAILED DESCRIPTION

The technical solutions in the embodiments of the present disclosure will be described with reference to the accompanying drawings.

Figure 1:
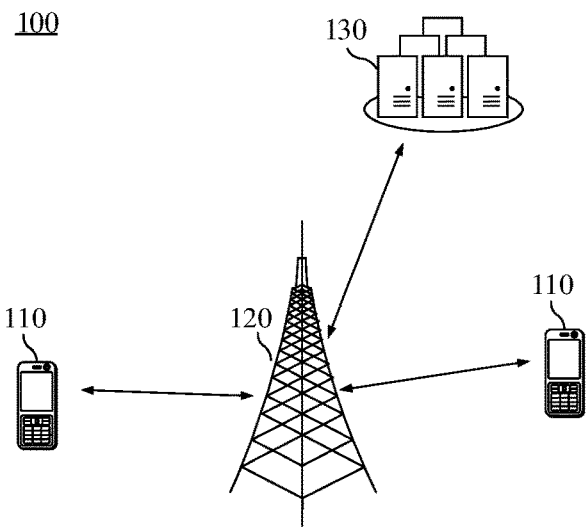
FIGS. 1 to 3 are each a schematic block diagram of a system framework according to an embodiment of the present disclosure.

FIG. 1 is a schematic diagram of an application scenario of an embodiment of the present disclosure.

As shown in FIG. 1, a communication system 100 may include terminal devices 110 and a network device 120. The network device 120 may communicate with a terminal device 110 through an air interface. Multi-service transmission is supported between the terminal device 110 and the network device 120.

It should be understood that embodiments of the present disclosure are illustrated merely by taking the communication system 100 as an example, but are not limited thereto. That is, the technical solutions of the embodiments of the present disclosure can be applied to various communication systems, such as a Long Term Evolution (LTE) system, LTE Time Division Duplex (TDD), an Universal Mobile Telecommunications System (UMTS), a Fifth Generation (5G) communication system (also called New Radio (NR) communication system), or future communication systems, and the like.

In the communication system 100 shown in FIG. 1, the network device 120 may be an access network device that communicates with the terminal device 110. The access network device may provide communication coverage for a particular geographic area and may communicate with a terminal device 110 (e.g. a User Equipment (UE)) located within the coverage area.

The network device 120 may be an Evolutional Node B (eNB or eNodeB) in a Long Term Evolution (LTE) system, or a Next Generation Radio Access Network (NG RAN) device, or a base station (gNB) in an NR system, or a wireless controller in a Cloud Radio Access Network (CRAN), or the network device 120 may be a relay station, an access point, a vehicle-mounted device, a wearable device, a hub, a switch, a bridge, a router, or a network device in a future evolved Public Land Mobile Network (PLMN), and the like.

The terminal device 110 may be any terminal device including but not limited to a terminal device in wired or wireless connection with the network device 120 or other terminal devices.

For example, the terminal device 110 may refer to an access terminal, a User Equipment (UE), a user unit, a user station, a mobile station, a mobile platform, a remote station, a remote terminal, a mobile device, a user terminal, a terminal, a wireless communication device, a user agent, or a user device. The access terminal may be a cellular phone, a cordless phone, a Session Initiation Protocol (SIP) telephone, a Wireless Local Loop (WLL) station, a Personal Digital Assistant (PDA), a handheld device or a computing device having a wireless communication function, or another processing device connected to a wireless modem, a vehicle-mounted device, a wearable device, a terminal device in a 5G network, or a terminal device in a future evolved network, and the like.

The terminal device 110 may be used for Device to Device (D2D) communication.

The wireless communication system 100 may also include a core network device 130 that communicates with the base station. The core network device 130 may be a 5G Core (5GC) device, for example, an Access and Mobility Management Function (AMF), or an Authentication Server Function (AUSF), or a User Plane Function (UPF), or a Session Management Function (SMF). Alternatively, the core network device 130 may also be an Evolved Packet Core (EPC) device of the LTE network, for example, a Session Management Function+Core Packet Gateway (SMF+PGW-C) device. It should be understood that SMF+PGW-C may achieve same functions as both SMF and PGW-C. In the process of network evolution, the core network device may also be called other names, or a new network entity may be formed by dividing the functions of the core network, which is not limited by the embodiments of the present disclosure.

Each functional unit in the communication system 100 may also establish a connection through a next generation (NG) interface to realize communication.

For example, the terminal device may establish an air interface connection with the access network device through an NR interface for transmitting user plane data and control plane signaling. The terminal device may establish a control plane signaling connection with AMF through an NG interface 1 (N1). The access network device such as a next generation radio access base station (gNB) may establish a user plane data connection with a UPF through an NG interface 3 (N3). The access network device may establish a control plane signaling connection with AMF through an NG interface 2 (N2). The UPF may establish a control plane signaling connection with SMF through an NG interface 4 (N4). The UPF may exchange user plane data with a data network through an NG interface 6 (N6). The AMF may establish a control plane signaling connection with SMF through an NG interface 11 (N11). The SMF may establish a control plane signaling connection with Point Coordination Function (PCF) through an NG interface 7 (N7).

FIG. 1 exemplarily illustrates one base station, one core network device, and two terminal devices. Optionally, the wireless communication system 100 may include a plurality of base stations and other numbers of terminal devices may be included within the coverage area of each base station, which is not limited by embodiments of the present disclosure.

Figure 2:
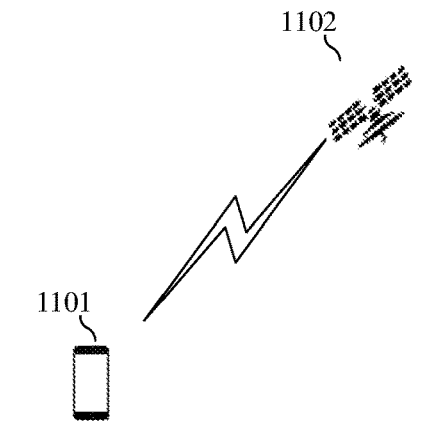

FIG. 2 is a schematic architectural diagram of another communication system according to an embodiment of the present disclosure.

As shown in FIG. 2, a terminal device 1101 and a satellite 1102 are included. Wireless communication may be performed between the terminal device 1101 and the satellite 1102. A network formed by the terminal device 1101 and the satellite 1102 may also be referred to as an NTN. In the architecture of the communication system shown in FIG. 2, the satellite 1102 may have a function of a base station, and a direct communication may be performed between the terminal device 1101 and the satellite 1102. Under the system architecture, the satellite 1102 may be called a network device. In some embodiments of the present disclosure, a plurality of network devices 1102 may be included in the communication system, and other numbers of terminal devices may be included within the coverage of each network device 1102, which is not limited by embodiments of the present disclosure.

Figure 3:
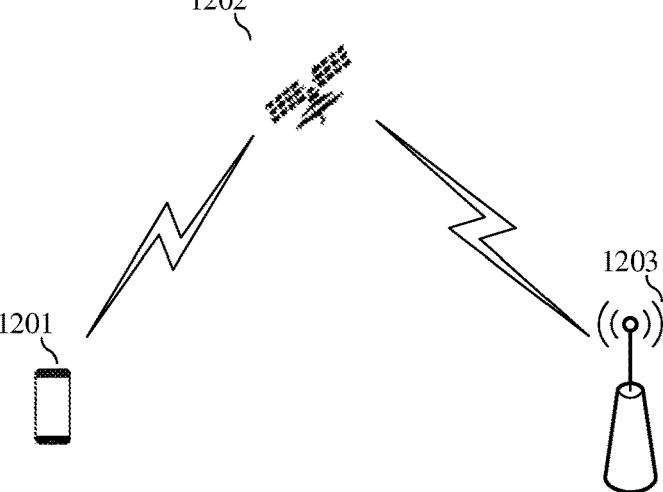

FIG. 3 is a schematic architectural diagram of another communication system according to an embodiment of the present disclosure.

As shown in FIG. 3, a terminal device 1201, a satellite 1202, and a base station 1203 are included. Wireless communication may be performed between the terminal device 1201 and the satellite 1202, and communication may be performed between the satellite 1202 and the base station 1203. The network formed among the terminal device 1201, the satellite 1202, and the base station 1203 may also be referred to as an NTN. In the architecture of the communication system shown in FIG. 3, the satellite 1202 may not have a function of a base station, and communication between the terminal device 1201 and the base station 1203 needs to be relayed through the satellite 1202. Under this system architecture, the base station 1203 may be referred to as a network device. In some embodiments of the present disclosure, a plurality of network devices 1203 can be included in the communication system, and other numbers of terminal devices can be included within the coverage of each network device 1203, which is not limited by embodiments of the present disclosure. The network device 1203 may be the network device 120 in FIG. 1.

It should be understood that the above-mentioned satellite 1102 or 1202 includes, but is not limited to: a Low-Earth Orbit (LEO) satellite, a Medium-Earth Orbit (MEO) satellite, a Geostationary Earth Orbit (GEO) satellite, a High Elliptical Orbit (HEO) satellite, and the like. A satellite may cover the ground with multiple beams. For example, a satellite may generate dozens or even hundreds of beams to cover the ground. In other words, beams of a satellite may cover a ground area with a diameter of tens to hundreds of kilometers, so as to ensure the coverage of the satellite and improve the system capacity of the whole satellite communication system.

As an example, an altitude of LEO may range from 500 km to 1500 km, and the corresponding orbital period may range from 1.5 hours to 2 hours. The signal propagation delay of single-hop communication between users may generally be lower than 20 ms. The maximum satellite visual time may be 20 minutes. LEO has a short signal propagation distance and low link loss, and does not require high transmission power of user terminals. The orbital altitude of GEO may be 35786 km, the rotation period around the earth may be 24 hours, and the signal propagation delay of single-hop communication between users may generally be 250 ms.

It should be noted that FIGS. 1 to 3 are only illustrative of the system to which the present disclosure applies, and of course, the methods shown in the embodiments of the present disclosure can also be applied to other systems. It is also to be noted that the terms "system" and "network" are often used interchangeably herein. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol. It should also be understood that the reference to "indication" in embodiments of the present disclosure may be a direct indication, may be an indirect indication, and may also be indicative of an association. For example, A indicates B, which can mean that A directly indicates B, for example, B can be obtained through A; it can also mean that A indirectly indicates B, for example, A indicates C, and B can be obtained by C; it can also indicate that there is an association between A and B.

Satellites can be divided, according to functions it provides, into two types: a transparent payload satellite and a regenerative payload satellite. For the transparent payload satellite, only functions of radio frequency filtering, frequency conversion, and amplification are provided, and only the transparent forwarding of signals is provided without changing the waveform signals forwarded by it. In addition to the functions of radio frequency filtering, frequency conversion, and amplification, the regenerative payload satellite can also provide demodulation/decoding, routing/conversion, coding/modulation functions, and have some or all functions of the base station.

In the NTN, one or more Gateways may be included for communication between the satellite and the terminal.

Figure 4:
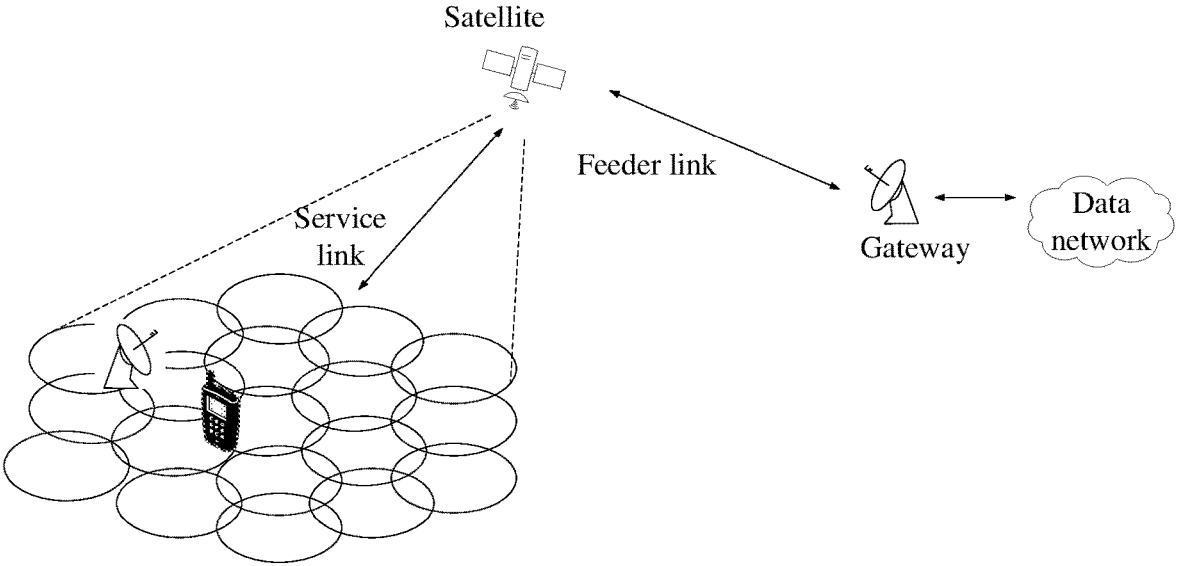
FIG. 4 is a schematic diagram of an NTN scenario based on a transparent payload satellite.
Figure 5:
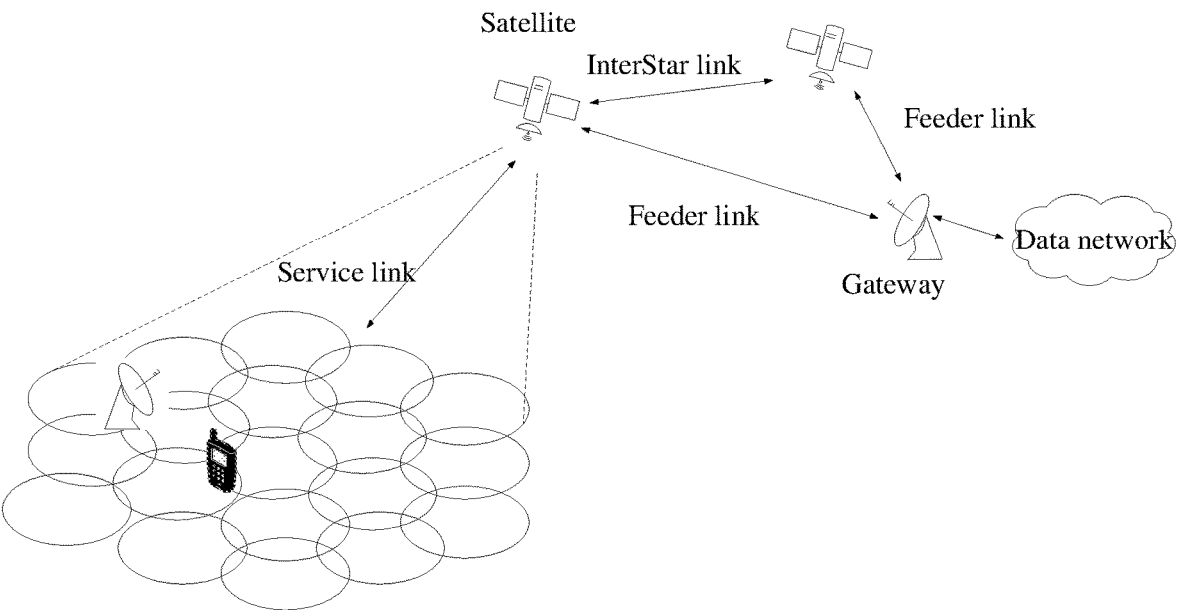
FIG. 5 is a schematic diagram of an NTN scenario based on regenerative payload satellites.

FIG. 4 and FIG. 5 show schematic diagrams of NTN scenarios based on a transparent payload satellite and a regenerative payload satellite, respectively.

As shown in FIG. 4, for an NTN scenario based on the transparent payload satellite, the gateway and the satellite communicate through a feeder link, and the satellite and the terminal may communicate through a service link. As shown in FIG. 5, for an NTN scenario based on the regenerative payload satellite, satellites may communicate with each other through an InterStar link, the gateway may communicate with the satellite through the feeder link, and the satellite may communicate with the terminal through the service link.

In order to ensure orthogonality of uplink transmissions and avoid intra-cell interference, the network requires that arrival times of signals transmitted from different UEs at the same time but with different frequency domain resources are basically aligned. In order to ensure the time synchronization on the network side, the mechanism of Uplink Timing Advance (TA) is introduced. An uplink clock and a downlink clock on the network side are identical, while there is an offset between an uplink clock and a downlink clock on the UE side, and different UEs have different uplink timing advances. By appropriately controlling the offset of each UE, the network can control the arrival times of uplink signals from different UEs at the network. For a UE far away from the network, due to the great transmission delay, it is necessary to transmit uplink data ahead of a UE close to the network. In the NTN scenario, due to a great signal transmission delay between the terminal and the network, in order to facilitate the terminal to complete an initial random access, the network can configure a common TA for the terminal device. Optionally, the common TA may be determined based on a signal transmission delay between the perigee and the base station.

In order to meet a demand of high speed, a Carrier Aggregation (CA) technology is also supported in 5G, that is, by jointly scheduling and using resources on multiple Component Carriers (CCs), the NR system may support greater bandwidth, thus achieving higher system peak rate.

Figure 6:
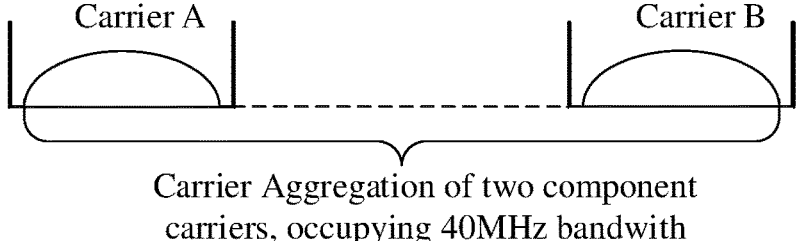
FIG. 6 and FIG. 7 are a schematic structural diagram of discontinuous aggregation according to an embodiment of the present disclosure and a schematic structural diagram of continuous aggregation according to an embodiment of the present disclosure respectively.
Figure 7:
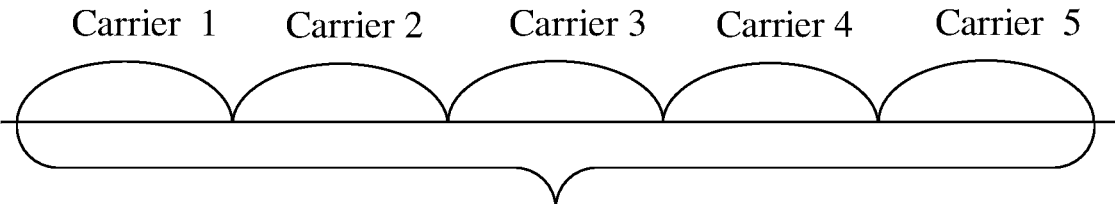

FIG. 6 and FIG. 7 are schematic structural diagrams of discontinuous aggregation according to embodiments of the present disclosure and a schematic structural diagram of continuous aggregation according to an embodiment of the present disclosure respectively.

As shown in FIG. 6, carrier discontinuous aggregation can be realized. The two component carriers are a carrier A and a carrier B respectively, and the carrier A and the carrier B are discontinuous carriers. Each of the carrier A and the carrier B occupies 20 MHz bandwidth. The carrier A and the carrier B occupy 40 MHz bandwidth together. As shown in FIG. 7, continuous carrier aggregation can also be realized. Five component carriers are carrier 1 to carrier 5, and the carrier 1 to the carrier 5 are continuous carriers, each carrier occupies 20 MHz bandwidth, and a total of 100 MHz bandwidth is occupied.

In NR CA, there is only one PCell Component (PCC), and the PCC provides RRC signaling connection, Non-Access Stratum (NAS) function, security, and the like. The Physical Uplink Control Channel (PUCCH) exists on and only on the PCC. SCell Component (SCC) only provides additional radio resources. PCC and SCC are both called serving cells. The standard also stipulates that the maximum number of aggregated carriers is 5, that is, the maximum bandwidth after aggregation is 100 MHZ, and the aggregated carriers belong to the same base station. All aggregated carriers use the same Cell Radio Network Temporary Identity (C-RNTI), and the base station implementation ensures that C-RNTI does not collide in the cell where each carrier is located. Since both asymmetric carrier aggregation and symmetric carrier aggregation are supported, the aggregated carriers are required to have to support downlink, but may not support uplink. Moreover, there must be Physical Downlink Control Channel (PDCCH) and PUCCH for a PCC cell, and only the PCC cell has PUCCH, while other SCC cells may have PDCCH.

An SCell has an active state and an inactive state. Only when the SCell is in the active state, the terminal device may transmit and receive data on the SCell. The SCell is configured by RRC dedicated signaling, and an initial configuration state is deactivated state, in which data transmission and reception cannot be carried out. Then, the SCell can be activated by MAC CE to transmit and receive data. In terms of SCell configuration and activation delay, this architecture is not an optimal architecture. This delay in turn reduces the efficiency of CA usage and radio resources, especially in small cell deployment scenarios. In a dense small cell deployment scenario, the signaling load of each SCell is also very great, especially when each SCell needs to be configured separately. Therefore, the current CA architecture introduces an extra latency, which limits the use of CA and reduces the gain of CA load sharing.

The terminal device may simultaneously monitor PDCCH on a PCell and one or more activated SCells, and transmit and receive data, thereby improving the data transmission rate. PUCCH is on the PCell. In addition, when supported by the terminal device, the network device can configure PUCCH for at most one additional SCell in a same Cell Group, the additional SCell being called PUCCH SCell. That is, for the PCell, there must be PDCCH and PUCCH for this cell, while for other SCells, there may be PDCCH, and only one of the SCells may have PUCCH.

In the current NR, for PDSCH downlink transmission of the PCell and the PUCCH SCell, the PUCCH corresponding to the HARQ feedback of the terminal device is located in its own cell. For PDSCH downlink transmission of other non-PUCCH SCells, PUCCH corresponding to HARQ feedback of terminal device supports to be semi-statically configured through RRC to be located in the PUCCH SCell or the PCell, and the relationship is unique.

In the current NR, Cross-carrier Scheduling semi-statically configured through RRC is supported, that is, for PDSCH or PUSCH of the PCell, the PDCCH scheduling the PDSCH or PUSCH of the PCell is also located on the PCell. For PDSCH or PUSCH of a SCell, besides by its own PDCCH, the PDSCH or the PUSCH of the SCell can also be scheduled by a PDCCH of the PCell or other SCells. But for a specific SCell, the PDCCH scheduling its PDSCH or PUSCH transmission is unique.

In the early deployment of the NR, it is difficult to obtain complete NR coverage, so the typical network coverage is a wide-area LTE coverage and an NR island coverage mode. Moreover, a great number of LTE are deployed below 6 GHz, and there are few spectrum below 6 GHz available for 5G. Therefore, it must be studied for the NR to support a spectrum application above 6 GHz, but the coverage of high frequency band is limited and the signal fades quickly. At the same time, in order to protect the early investment of mobile operators in LTE, a working mode of tight interworking between LTE and NR, namely Dual Connectivity (DC) technology, is proposed.

DC may operate in a variety of working modes, such as EN-DC (LTE-NR Dual Connectivity), NE-DC, 5GC-EN-DC, NR DC, and the like. For EN-DC, the core network connected to the access network is EPC, while for other DC modes, the core network connected to the access network is 5GC. From the perspective of Dual Connectivity (DC), multiple Cell Groups (CGs) may serve a same terminal device, and replicated data can be transmitted between the CG and the terminal device. Optionally, in some embodiments of the present disclosure, the CG may be equivalent to a network node or a network device, or the like.

Figure 8:
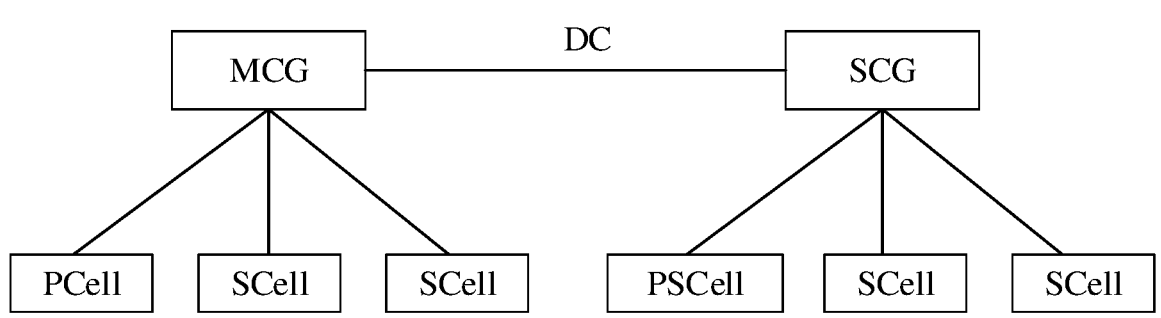
FIG. 8 is a schematic structural diagram of CA under DC according to an embodiment of the present disclosure.

FIG. 8 is a schematic structural diagram of CA under DC according to an embodiment of the present disclosure.

As shown in FIG. 8, under the DC, the CG of the terminal device may include a Master Cell Group (MCG), or a Secondary Cell Group (SCG). The MCG may include a PCell and at least one SCell, for example, two SCells. The SCG may include a Primary Secondary Cell (PSCell) and at least one SCell, for example, two SCells.

Random access is described below.

After a cell search process, the terminal device has achieved downlink synchronization with the cell, so that the terminal device can receive downlink data. However, only when the terminal device obtains uplink synchronization with the cell can it carry out uplink transmission. The terminal device may establish connection with the cell and obtain uplink synchronization through a random access procedure (RAR). That is, through the random access, the terminal device may obtain the uplink synchronization and obtain an unique identity, that is, Cell Radio Network Temporary Identity (C-RNTI), assigned to it by the network device. Therefore, the random access can be applied not only in an initial access, but also in a case of user uplink synchronization loss.

Optionally, the random access procedure of embodiments of the present disclosure may generally be triggered by one of following types of triggering events.

(1) Initial access.
(2) Handover.
(3) RRC Connection Re-establishment.
(4) In an RRC connected state, when the downlink data arrives, the uplink is in an "asynchronous" state. At this time, the terminal device needs to reply an Acknowledgement (ACK) or a Negative Acknowledgement (NACK) after the downlink data arrives.

(5) In the RRC connected state, when the uplink data arrives, the uplink is in an "asynchronous" state.
(6) In the RRC connected state, there is no available Physical Uplink Control Channel (PUCCH) resource for Scheduling Request (SR) transmission. At this time, a terminal device already in the uplink synchronization state may be allowed to use a Random Access Channel (RACH) instead of the SR.
(7) The terminal device transits from an RRC_INACTIVE state to an RRC_ACTIVE state.
(8) The terminal device requests Other System Information (OSI).
(9) Beam failure recovery of terminal device.

There are two main forms of random access procedures: one is a contention-based RACH procedure, which includes four steps; the other is a contention-free RACH procedure, which includes two steps.

For ease of understanding, the random access procedures will be briefly described below in combination with FIGS. 9 to 12.

Figure 9:
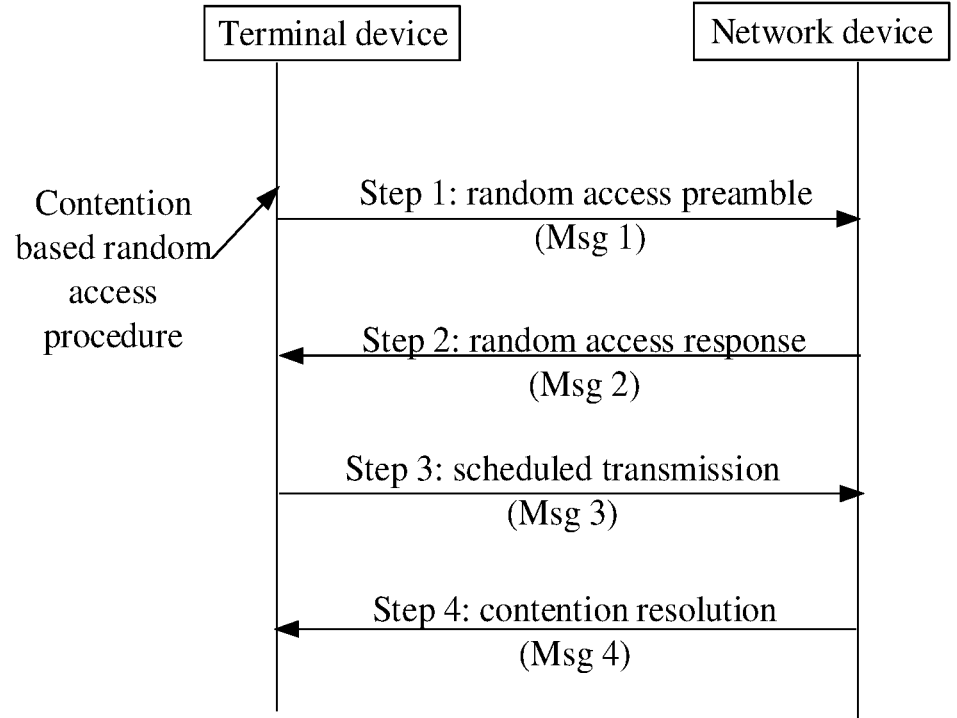
FIGS. 9 to 12 are each an interaction flowchart of a random access procedure according to an embodiment of the present disclosure.

FIG. 9 is a interaction flowchart of a contention-based random access procedure according to an embodiment of the present disclosure.

As shown in FIG. 9, the random access procedure may include the following four steps.

At step 1, a terminal device transmits Msg 1 to a base station.

The terminal device transmits Msg 1 to the base station to inform a network device that the terminal device has initiated a random access request, Msg 1 carrying a Random Access Preamble (RAP), which is also called a Random Access Preamble sequence, a preamble sequence, a preamble, and the like. Specifically, the terminal device selects a preamble index and a PRACH resource for transmitting the preamble. Then, the terminal device transmits the preamble on the PRACH. The network device will inform all the terminal devices about which time-frequency resources are allowed to transmit the preamble, by broadcasting the System Information Block (SIB) of the system information, such as SIB2. In the case of contention-free-based random access, the PRACH resource and the preamble may be specified by the network device. The network device may estimate, based on the preamble, the uplink Timing and the grant size required by the terminal to transmit Msg 3.

At step 2, the network device transmits Msg 2 to the terminal device.

After receiving Msg 1 transmitted by the terminal device, the network device transmits Msg 2, that is, a Random Access Response (RAR) message, to the terminal device. Msg 2 may carry, for example, Timing Advance (TA), an uplink grant instruction such as configuration of uplink resources, a Temporary Cell-Radio Network Temporary Identity (TC-RNTI), and the like.

The terminal device monitors the Physical Downlink Control Channel (PDCCH) in a ra-ResponseWindow to receive an RAR message replied by the network device. The RAR message can be scrambled using a respective Random Access Radio Network Temporary Identifier (RA-RNTI). The RA-RNTI is calculated by:

$$RA\text{-}RNTI = 1 + s\_id + 14 \times t\_id + 14 \times 80 \times f\_id + 14 \times 80 \times 8 \times ul\_carrier\_id,$$

where RA-RNTI is related to the PRACH time-frequency resource used by terminal device to transmit Msg 1.

Optionally, Msg 2 may include RAR messages for a plurality of terminal devices, and the RAR message for each terminal device may include: a Backoff Indicator (BI)

included in a sub-header of the RAR, which is used for indicating a backoff time of a re-transmission of Msg 1; a Random Access Preamble Identity (RAPID) in RAR, which is a preamble index received in response from the network; a TAG included in the payload of RAR, which is used for adjusting the uplink timing; an Uplink (UL) grant which is an uplink resource indication used for scheduling Msg 3; and a temporary Cell Radio Network Temporary Identifier (TC-RNTI) used for scrambling PDCCH (Initial Access) of Msg 4.

When the terminal device does not receive the RAR message replied by the network device within the RAR window, the random access procedure is considered to fail. When the terminal receives the PDCCH scrambled by RA-RNTI and the preamble index carried in the RAR is the same as the preamble index transmitted by the terminal device through Msg 1, the RAR is considered to have been successfully received, and then the terminal device may stop monitoring in the RAR window.

At step 3, the terminal device transmits Msg 3 on resources scheduled by the network.

After receiving the RAR message, the terminal device determines whether the RAR is its own RAR message. For example, the terminal device can check the RAR message by using the preamble identity. After determining that the RAR message is its own, the terminal device generates Msg 3 at the RRC layer and transmits Msg 3 to the network device. Msg 3 needs to carry the identity information of the terminal device or the like.

Specifically, for different random access triggering events, Msg 3 may include different contents for scheduled transmission. For example, for an initial access scenario, Msg 3 may include information such as a user equipment identity (UE ID) and an establishment cause. Specifically, Msg 3 may include an RRC Connection Request generated by the RRC layer, which carries at least Non-Access Stratum (NAS) identity information of the terminal device, and may also carry, for example, a Serving-Temporary Mobile Subscriber Identity (S-TMSI) of the terminal device or a random number. For another example, for a connection re-establishment scenario, Msg 3 may include information such as a connected-state UE identity and an establishment cause. Specifically, Msg 3 may include an RRC Connection Re-establishment Request generated by the RRC layer without carrying any NAS messages, and may also carry, for example, a Cell Radio Network Temporary Identifier (C-RNTI), and Protocol Control Information (PCI), and the like. For another example, for a handover scenario, Msg 3 may include an RRC Handover Confirm generated by the RRC layer and a C-RNTI of the terminal device, and may also carry, for example, a Buffer Status Report (BSR). For other triggering events such as scenarios where uplink/downlink data arrives, Msg 3 needs to include at least the C-RNTI of the terminal device.

At step 4, Msg 4 is transmitted by the network device to the terminal device.

Msg 4 has two functions: one is for contention conflict resolution, and the other is for the network device to transmit an RRC configuration message to the terminal device. There are two ways for contention conflict resolution. One is that when the terminal device carries C-RNTI in Msg 3, Msg 4 is scheduled with PDCCH scrambled by C-RNTI. The other is that when the terminal device does not carry C-RNTI in Msg 3, for example, during an initial access, Msg 4 is scheduled with the PDCCH scrambled by TC-RNTI, and the conflict resolution is that the UE receives the PDSCH of Msg 4 and matches the CCCH SDU in the PDSCH. Specifically, the network device transmits Msg 4 to the terminal device, and the terminal device correctly receives Msg 4 to complete the Contention Resolution. For example, during the RRC connection establishment process, an RRC connection establishment message can be carried in Msg 4. Since the terminal device carries, at step 3, its own unique identity such as C-RNTI or identity information from the core network (such as S-TMSI or a random number) in Msg 3, then in the contention resolution mechanism, the network device will carry the unique identity of the terminal device in Msg 4 to designate the terminal device winning the contention. On the other hand, other terminal devices that do not win in the contention solution will re-initiate random access.

Figure 10:
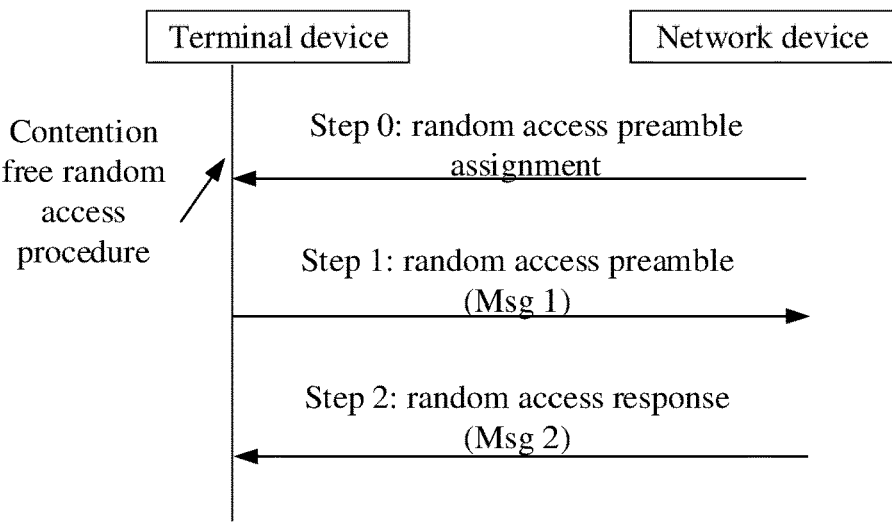

FIG. 10 is an interaction flowchart of a contention-free random access procedure according to an embodiment of the present disclosure. It should be noted that the random access procedure may include the first two steps in FIG. 9 (i.e. steps 1 and 2 in FIG. 5). For Msg 1 and Msg 2 in a contention-free random access procedure, reference can be specifically made to the aforementioned description of Msg 1 and Msg 2 in a contention-based random access procedure, which will not be repeated here for the sake of brevity.

As shown in FIG. 10, the random access procedure may include the following.

At step 0, the network device transmits an RA Preamble assignment message to the terminal device.

At step 1, the terminal device transmits Msg 1 to the network device.

The terminal device transmits Msg 1 to the base station to inform the network device that the terminal device has initiated a random access request, and Msg 1 carries a random access preamble.

At step 2, the network device transmits Msg 2 to the terminal device.

After receiving Msg 1 transmitted by the terminal device, the network device transmits Msg 2, that is, an RAR message, to the terminal device. Msg 2 may carry, for example, TA information, uplink grant instructions such as configuration of uplink resources, TC-RNTI, and other information. When the terminal device does not receive the RAR message replied by the network device within the RAR window, the random access procedure is considered to fail. When the terminal device successfully receives the RAR message, and the preamble index carried in the RAR message is the same as that of the preamble transmitted by the terminal device through Msg 1, the RAR is considered to have been successfully received, and the terminal device may stop monitoring the RAR message at this time.

In addition, NR Rel-16 version introduces a two-step random access procedure to reduce the delay and signaling overhead.

Figure 11:
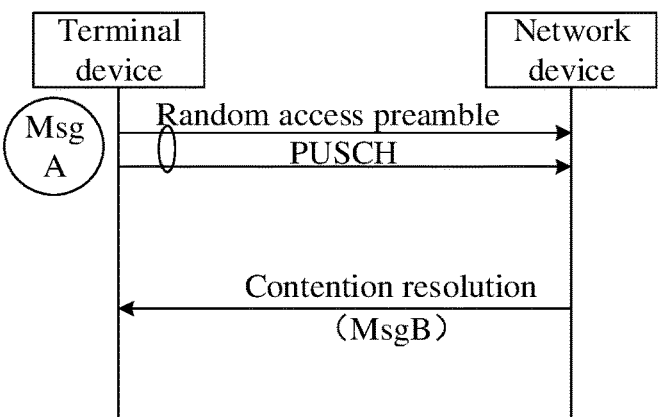

FIG. 11 is a schematic interaction flowchart of a two-step random access procedure according to an embodiment of the present disclosure.

As shown in FIG. 11, the two-step random access procedure may include the following.

At S310, the terminal device transmits MsgA to the network device. MsgA may include Msg 1 and Msg 3 in the four-step random access procedure described above.

At S320, the terminal device receives MsgB transmitted by the network device. MsgB may include Msg 2 and Msg 4 in the four-step random access procedure described above.

In other words, the step 1 and step 3 of the four-step random access procedure are merged into the step 1 of the two-step random access procedure (message A), and the step 2 and step 4 of the four-step random access procedure are merged into the step 2 of the two-step random access procedure (message B). Therefore, in the step 1 of the two-step random access procedure, the terminal device needs to transmit the preamble and PUSCH. For example, for MsgA, it may include a preamble and an uplink data portion (e.g. carried by PUSCH), the uplink data portion carrying the identity information of the terminal device and/or the cause of the RRC request (i.e. equivalent to the contents of the existing Msg 3). MsgB may include conflict resolution information, TA information, and C-RNTI allocation information, and the like, that is, MsgB may include information equivalent to a combination of parts of the existing Msg 2 and Msg 4.

In the two-step random access procedure, when the terminal needs random access, the terminal transmits MsgA on MsgA resources corresponding to the two-step random access procedure, i.e. RACH Occasion and PUSCH Occasion, which appear in a network configured cycle. The terminal then monitors, in the RAR window, an RAR message (MsgB) transmitted by the network.

In short, MsgA in the two-step random access procedure includes the preamble transmitted on the PRACH and the load information transmitted on the PUSCH. After MsgA transmission, the terminal device monitors the response from the network side in the configured window. When the terminal device receives the indication that the contention conflict resolution is successful from the network, the terminal device ends the random access procedure.

It should be noted that MsgB RAR message in the two-step random access procedure can also carry a plurality of response messages for MsgAs transmitted for a plurality of terminal devices. For example, they can be divided into the following types of messages.

SuccessRAR: when the network device successfully receives the preamble and PUSCH information in MsgA, the terminal feeds back the SuccessRAR, which can carry TA command, C-RNTI, and conflict resolution ID, and the like.

FallbackRAR: when the network device successfully detects the preamble part in the terminal MsgA, but does not receive the PUSCH part correctly, the network may transmit the FallbackRAR to the terminal, so that the terminal may fall back to the traditional four-step random access procedure. After the terminal receives the FallbackRAR, the terminal transmits Msg 3 to the network.

Figure 12:
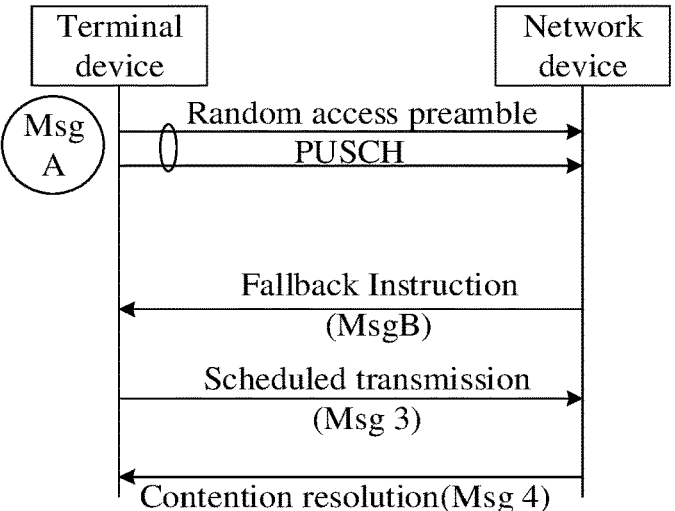

FIG. 12 is a schematic interaction flowchart of a fallback from a two-step random access procedure to a four-step random access procedure according to an embodiment of the present disclosure. As shown in FIG. 12, when a fallback instruction is received in MsgB, the terminal executes the transmission of Msg 3 and monitors the contention conflict resolution result (i.e. Msg 4), and when the contention resolution is unsuccessful, the terminal continues the transmission of MsgA.

It should be noted that MsgB RAR message can also carry other information, such as Backoff Indicator (BI), which is used for indicating how to adjust the time parameter of a re-transmission of MsgA when the terminal does not receive the RAR message. When the terminal device needs to initiate an contention-based random access on a licensed band, since multiple terminal devices may be configured with common PRACH resource, different terminal devices may compete for resources on the same PRACH resource. When a resource conflict occurs, for example, when multiple terminal devices choose a same PRACH occasion, the network device may carry a Backoff Indicator (BI) in the RAR message of Msg 2. A terminal device for which a resource collision occurs may generate a random number based on the BI, so that when the next PRACH resource arrives, delay is made based on the random number, thereby delaying the transmission of MsgA by a corresponding time, and hence alleviating the probability of resource collision to a certain extent.

It can be seen from the above random access procedure that the main purpose of random access is to achieve uplink synchronization between the terminal and the cell. In the random access procedure, the network device may know the time when the terminal device transmits the preamble, based on the RACH time-frequency resource used to receive the preamble from the terminal device, thereby determining the initial TA of the terminal device based on the transmitting time and receiving time of the preamble, and informing the terminal device through the RAR.

Up to now, for a Carrier Aggregation (CA) scenario, the random access procedure in the SCell only supports Contention free Random Access (CFRA) triggered by the base station. After the terminal device transmits the preamble, it will monitor the PDCCH in the RAR window to receive the RAR corresponding to the RA-RNTI. When no RAR reply is received from the network device within the RAR window, the random access procedure is considered to fail. However, the terminal device transmits the preamble on the SCell, but needs to monitor Msg 2 on the PCell.

As for NTN, up to now, there is no specific discussion on CA. Regarding the scenario of transparent payload satellite, in order to improve the transmission rate of terminals in actual deployment, CA between TN and NTN and CA between NTN and NTN can be considered. However, there may be significant differences between Round Trip Times (RTTs) between terminal devices and network devices in different TN and NTN cells for CA. In order to achieve the purpose of energy saving of the terminal, in the embodiments of the present disclosure, an offset is introduced for an initiating time of the RAR window, the offset being related to the RTT of the NTN cell. Based on this, the present disclosure provides a solution for determining the offset after introducing the CA between TN and NTN and the CA between NTN and NTN.

Figure 13:
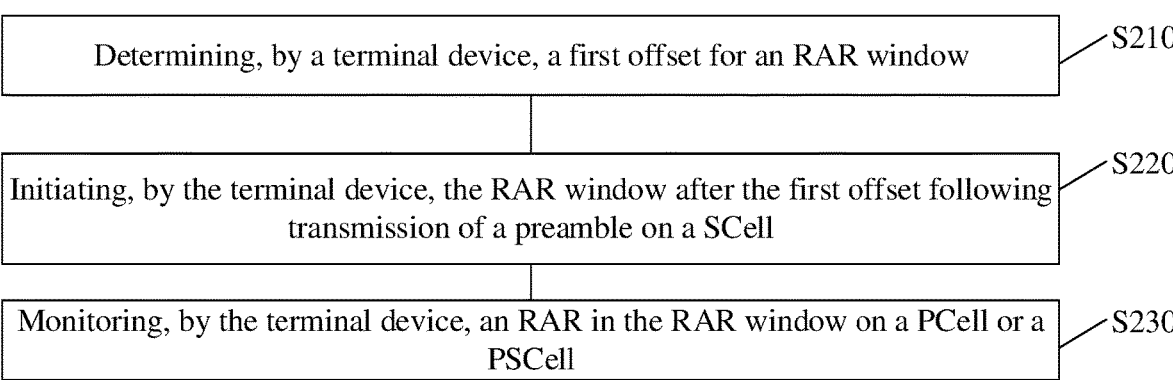
FIG. 13 is a schematic flow chart of a wireless communication method according to an embodiment of the present disclosure.

FIG. 13 is a schematic flowchart of a wireless communication method 200 according to an embodiment of the present disclosure. The method 200 may be performed by a terminal device, e.g., the terminal device 110 shown in FIG. 1.

As shown in FIG. 13, the method 200 may include the following.

At S310, a terminal device determines a first offset for an RAR window.

At S320, the terminal device initiates the RAR window after the first offset following transmission of a preamble on an SCell.

At S330, the terminal device monitors an RAR in the RAR window on a PCell or a PSCell.

For example, for a CA scenario, the terminal device monitors the RAR in the RAR window on the PCell.

For another example, for a CA scenario under DC, when the SCell is an SCell in MCG, the terminal device monitors the RAR in the RAR window on the PCell. When the SCell is an SCell in SCG, the terminal device monitors the RAR in the RAR window on the PSCell.

Based on the above technical solution, by initiating RAR window after the first offset, the random access procedure can be optimized, thereby reducing the power consumption of the terminal device.

In some embodiments of the present disclosure, the S310 may include determining, by the terminal device, the first offset based on an estimated TA value of a first NTN cell. For example, the terminal device determines half of the TA value of the first NTN cell as the first offset. Of course, the terminal device may also determine ⅓ or ⅔ of the TA value of the first NTN cell as the first offset, which is not specifically limited in the embodiment of the present disclosure.

Optionally, the TA value of the first NTN cell is a sum of the service link RTT value of the first NTN cell and a common TA of the first NTN cell. Optionally, the service link RTT value is determined from a Global Navigation Satellite System (GNSS) position of the terminal device and ephemeris information of a satellite, and/or the common TA value is obtained from a system broadcast message. Optionally, the method is suitable for CA between the TN and the NTN, with the PCell, the SCell, or the PSCell being the first NTN cell.

It should be noted that in the CA scenario, the terminal device may have a plurality of SCells, and the first NTN cell is an SCell involving preamble transmission among the plurality of SCells, or the first NTN cell is an SCell for which the RAR window needs to be initiated among the plurality of SCells. Similarly, the terminal device may have a plurality of PSCells, and the first NTN cell is a PSCell for which the RAR needs to be monitored in the RAR window among the plurality of PSCells.

In some embodiments of the present disclosure, the S310 may include determining, by the terminal device, the first offset based on an RTT value of a first NTN cell. For example, the terminal device determines half of the RTT value of the first NTN cell as the first offset. Of course, the terminal device may also determine ⅓ or ⅔ of the RTT value of the first NTN cell as the first offset, which is not specifically limited in the embodiment of the present disclosure.

Optionally, the RTT value of the first NTN cell is a sum of a service link RTT value of the first NTN cell and a feeder link RTT value of the first NTN cell. Optionally, the service link RTT value is determined from a GNSS position of the terminal device and ephemeris information of a satellite, and/or the feeder link RTT value is obtained from a system broadcast message. Optionally, the RTT value of the first NTN cell is a sum of a service link RTT value of the first NTN cell, a common TA value of the first NTN cell and a compensating TA value of the first NTN cell. Optionally, the service link RTT value is determined from a GNSS position of the terminal device and ephemeris information of a satellite, and/or the common TA value is obtained from a system broadcast message, and/or the compensating TA value is obtained from a system broadcast message. Optionally, the method is applied to CA between a TN and an NTN, with the PCell, the SCell, or the PSCell being the first NTN cell.

It should be noted that in the CA scenario, the terminal device may have a plurality of SCells, and the first NTN cell is an SCell involving preamble transmission among the plurality of SCells, or the first NTN cell is an SCell for which the RAR window needs to be initiated among the plurality of SCells. Similarly, the terminal device may have a plurality of PSCells, and the first NTN cell is a PSCell for which the RAR needs to be monitored in the RAR window among the plurality of PSCells.

In some embodiments of the present disclosure, the S310 may include determining, by the terminal device, the first offset based on an estimated TA value of a second NTN cell and an estimated TA value of a third NTN cell. For example, the terminal device determines half of a sum of the TA value of the second NTN cell and the TA value of the third NTN cell as the first offset. Of course, the terminal device may also determine ⅓ or ⅔ of the sum of the TA value of the second NTN cell and the TA value of the third NTN cell as the first offset, which is not specifically limited in the embodiment of the present disclosure.

Optionally, the TA value of the second NTN cell is a sum of a service link RTT value of the second NTN cell and the common TA of the second NTN cell, and/or the TA value of the third NTN cell is a sum of a service link RTT value of the third NTN cell and the common TA of the third NTN cell. Optionally, the service link RTT value is determined from a GNSS position of the terminal device and ephemeris information of a satellite, and/or the common TA value is obtained from a system broadcast message. Optionally, the method is applied to CA between an NTN and an NTN, with the PCell or the PSCell being the second NTN cell, and the SCell being the third NTN cell.

It should be noted that in the CA scenario, the terminal device may have a plurality of SCells, and the third NTN cell is an SCell involving preamble transmission among the plurality of SCells, or the third NTN cell is an SCell for which the RAR window needs to be initiated among the plurality of SCells. Similarly, the terminal device may have a plurality of PSCells, and the second NTN cell is a PSCell for which the RAR needs to be monitored in the RAR window among the plurality of PSCells.

In some embodiments of the present disclosure, the S310 may include determining, by the terminal device, the first offset based on an RTT value of a second NTN cell and an RTT value of a third NTN cell. For example, the terminal device determines half of a sum of the RTT value of the second NTN cell and the RTT value of the third NTN cell as the first offset. Of course, the terminal device may also determine ⅓ or ⅔ of the sum of the RTT value of the second NTN cell and the RTT value of the third NTN cell as the first offset, which is not specifically limited in the embodiment of the present disclosure.

Optionally, the RTT value of the second NTN cell is a sum of a service link RTT value of the second NTN cell and a feeder link RTT value of the second NTN cell; and/or, the RTT value of the third NTN cell is a sum of a service link RTT value of the third NTN cell and a feeder link RTT value of the third NTN cell. Optionally, the service link RTT value is determined from a GNSS position of the terminal device and ephemeris information of a satellite, and/or the feeder link RTT value is obtained from a system broadcast message. Optionally, the RTT value of the second NTN cell is a sum of the service link RTT value of the second NTN cell, a common TA value of the second NTN cell, and a compensating TA value of the second NTN cell; and/or, the RTT value of the third NTN cell is a sum of a service link RTT value of the third NTN cell, a common TA value of the third NTN cell, and a compensating TA value of the third NTN cell. Optionally, the service link RTT value is determined from a GNSS position of the terminal device and ephemeris information of a satellite, and/or the common TA value is obtained from a system broadcast message, and/or the compensating TA value is obtained from a system broadcast message. Optionally, the method is applied to carrier aggregation CA between an NTN and an NTN, with the PCell or the PSCell being the second NTN cell, and the SCell being the third NTN cell.

It should be noted that in the CA scenario, the terminal device may have a plurality of SCells, and the third NTN cell is an SCell involving preamble transmission among the plurality of SCells, or the third NTN cell is an SCell for which the RAR window needs to be initiated among the plurality of SCells. Similarly, the terminal device may have a plurality of PSCells, and the second NTN cell is a PSCell for which the RAR needs to be monitored in the RAR window among the plurality of PSCells.

To sum up, in the embodiments of the present disclosure, by introducing the first offset in the random access procedure of the SCell and initiating the RAR window after the first offset, the random access procedure can be optimized, thereby reducing the power consumption of the terminal device. In particular, the terminal device can correctly receive RAR under the CA scenario between the TN and the NTN and between the NTN and the NTN, and at the same time achieve a purpose of saving power for the terminal.

The solutions of the present disclosure are described below in connection with specific embodiments.

Embodiment 1

The embodiment is applied to a CA scenario between a TN and an NTN.

Figure 14:
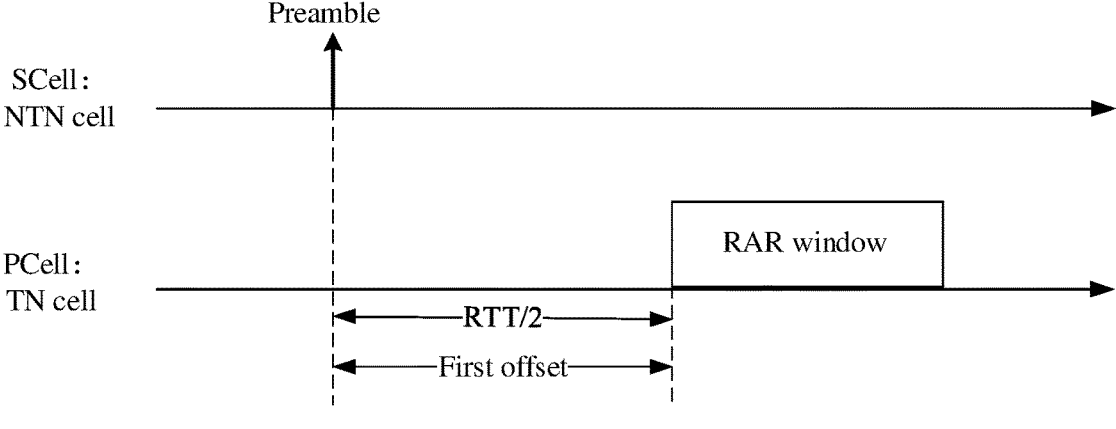
FIG. 14 and FIG. 15 are each a schematic relationship diagram of a positional relationship between a first offset and an RAR window according to an embodiment of the present disclosure.

FIG. 14 is a schematic relationship diagram of a positional relationship between a first offset and an RAR window according to an embodiment of the present disclosure.

As shown in FIG. 14, a terminal device in a connected state receives an RRC reconfiguration message transmitted by the network device and configures one or more SCells. CA configuration may be: a) The PCell is a TN cell and the SCell is an NTN cell; or b) The PCell is an NTN cell and the SCell is a TN cell.

The terminal device receives a PDCCH signaling (order) transmitted by the network device and the terminal device is triggered to initiate a random access procedure in the SCell. The terminal device initiates an RAR window after a first offset following transmission of a preamble on the SCell. A value of the first offset may be determined by one of the following schemes.

Scheme 1

Half of a TA value of the NTN cell (PCell or SCell) estimated by the terminal device is determined as the value of the first offset, the TA value estimated by the terminal device being equal to a sum of a service link RTT value and a common TA value. The service link RTT value may be determined from a Global Navigation Satellite System (GNSS) position of the terminal device and ephemeris information of a satellite. The common TA value may be obtained from a system broadcast message.

Scheme 2

Half of an RTT value of the NTN cell (the PCell or the SCell) is determined as the value of the first offset. The scheme 2 includes the following two sub-schemes.

Sub-Scheme 1

The RTT value is a sum of a service link RTT value and a feeder link RTT value. The service link RTT value may be calculated from a GNSS position of the terminal device and ephemeris information of a satellite where the corresponding NTN cell is located. The feeder link RTT value may be obtained by a broadcast signaling.

Sub-Scheme 2

The RTT value is a sum of a service link RTT value, a common TA value, and a compensating TA value. The service link RTT value may be calculated from a GNSS position of the terminal device and ephemeris information of the satellite where the corresponding NTN cell is located. The common TA value may be obtained by a broadcast signaling. The compensating TA value may be obtained from a broadcast signaling.

In this embodiment, for the CA between the Terrestrial Network (TN) and the Non Terrestrial Network (NTN), after the transmission of the preamble on the SCell by the terminal device, the half of the terminal device's estimated TA value of the NTN cell or the half of the RTT value of the NTN cell is determined as the value of the first offset of the initiating time of the RAR window.

Embodiment 2

The embodiment is applied to a CA scenario between NTNs.

Figure 15:
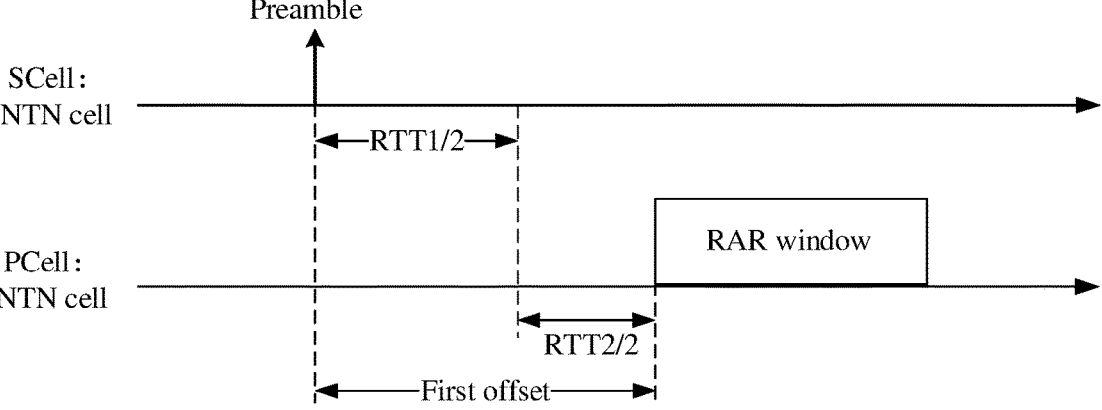

FIG. 15 is a schematic relationship diagram of a positional relationship between a first offset and an RAR window according to an embodiment of the present disclosure.

As shown in FIG. 15, a terminal device in a connected state receives an RRC reconfiguration message transmitted by the network device and configures one or more SCells. CA configuration may be that the PCell is an NTN cell and the SCell is also an NTN cell. The terminal device receives a PDCCH signaling (order) transmitted by the network device and the terminal device is triggered to initiate a random access procedure in the SCell. After the terminal device transmits a preamble on the SCell, the RAR window is initiated after a first offset. A value of the first offset may be determined by one of the following schemes.

Scheme 1

Half of a sum of TA values of the two NTN cells (the PCell and the SCell) estimated by the terminal device, i.e. $(TA1+TA2)/2$, is determined as the value of the first offset. The estimated TA value is equal to a sum of a service link RTT value and a common TA value. That is, TA1 is equal to a sum of a service link RTT1 value and a common TA1 value. TA2 is equal to a sum of a service link RTT2 value and a common TA2 value. The service link RTT value may be calculated from the GNSS position of the terminal device and the ephemeris information of the satellite where the corresponding NTN cell is located, and the public TA value of the corresponding NTN cell may be obtained from system message broadcasting.

Scheme 2

Half of a sum of RTT values of the two NTN cells (PCell and SCell), i.e. $(RTT1+RTT2)/2$, is determined as the value of the first offset. Specifically, The scheme 2 includes the following two sub-schemes.

Sub-Scheme 1

The RTT value is a sum of a service link RTT value and a feeder link RTT value. The service link RTT value may be calculated from a GNSS position of the terminal device and ephemeris information of a satellite where the corresponding NTN cell is located. The feeder link RTT value of the corresponding NTN cell may be obtained by a broadcast signaling.

Sub-Scheme 2

The RTT value is a sum of a service link RTT value, a common TA value, and a compensating TA value. The service link RTT value may be calculated from a GNSS position of the terminal device and ephemeris information of the satellite where the corresponding NTN cell is located. The common TA value of the corresponding NTN cell may be obtained by a broadcast signaling. The compensating TA value of the corresponding NTN cell can be obtained by a broadcast signaling.

In this embodiment, for the CA between the NTNs, after the transmission of the preamble on the SCell by the terminal device, half of the sum of the terminal device's estimated TA values of the two NTN cells or half of the sum of the RTT values of the two NTN cells is determined as the value of the first offset of the initiating time of the RAR window.

Embodiments of the present disclosure have been described in detail with reference to the accompanying drawings, but the present disclosure is not limited to the specific details of the above embodiments. Within the scope of the technical conception of the present disclosure, various simple modifications can be made to the technical solution of the present disclosure, and these simple modifications all belong to the scope of protection of the present disclosure. For example, each of the specific technical features described in the above specific embodiments may be combined in any suitable manner without contradiction, and various possible combinations are not further described in the present disclosure in order to avoid unnecessary repetition. For example, any combination may be made between the various embodiments of the present disclosure so long as it does not depart from the idea of the present disclosure and is likewise to be regarded as the disclosure of the present disclosure.

It should also be understood that in the various method embodiments of the present disclosure, the sequence number of the above-mentioned processes does not mean the order of execution, and the execution order of the processes should be determined by their functions and inherent logic, and should not be defined in any way by the implementation of the embodiments of the present disclosure. In addition, in embodiments of the present disclosure, the term "and/or" is merely an association relationship that describes an associated object, indicating that three relationships may exist. Specifically, A and/or B can represent three cases: A exists alone, A and B exist at the same time, and B exists alone. In addition, the character "/" in used herein generally indicates that the related objects are a kind of "or" relationship.

Apparatus embodiments of the present disclosure are described in detail below with reference to FIGS. 16 to 18.

Figure 16:
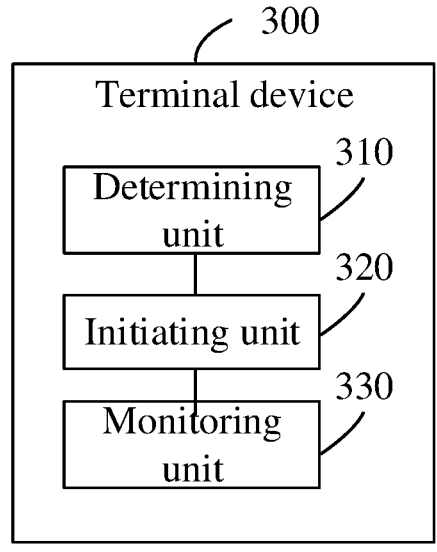
FIG. 16 and FIG. 17 are each a schematic block diagram of a terminal device according to an embodiment of the present disclosure.

FIG. 16 is a schematic block diagram of a terminal device 300 according to an embodiment of the present disclosure.

As shown in FIG. 16, the terminal device 300 may include a determining unit 310, an initiating unit 320, and a monitoring unit 330. The determining unit 310 is configured to determine a first offset for an RAR window. The initiating unit 320 is configured to initiate the RAR window after the first offset following transmission of a preamble on an SCell. The monitoring unit 330 is configured to monitor an RAR in the RAR window on a PCell or a PSCell.

In some embodiments of the present disclosure, the determining unit 310 is specifically configured to determine the first offset based on an estimated TA value of a first NTN cell.

In some embodiments of the present disclosure, the determining unit 310 is specifically configured to determine half of the TA value of the first NTN cell as the first offset.

In some embodiments of the present disclosure, the TA value of the first NTN cell is a sum of a service link RTT value of the first NTN cell and a common TA of the first NTN cell.

In some embodiments of the present disclosure, the service link RTT value is determined from a GNSS position of the terminal device and ephemeris information of a satellite; and/or the common TA value is obtained from a system broadcast message.

In some embodiments of the present disclosure, the determining unit 310 is specifically configured to determine the first offset based on an RTT value of a first NTN cell.

In some embodiments of the present disclosure, the determining unit 310 is specifically configured to determine half of the RTT value of the first NTN cell as the first offset.

In some embodiments of the present disclosure, the RTT value of the first NTN cell is a sum of a service link RTT value of the first NTN cell and a feeder link RTT value of the first NTN cell.

In some embodiments of the present disclosure, the service link RTT value is determined from a GNSS position of the terminal device and ephemeris information of a satellite; and/or the feeder link RTT value is obtained from a system broadcast message.

In some embodiments of the present disclosure, the RTT value of the first NTN cell is a sum of a service link RTT value of the first NTN cell, a common TA value of the first NTN cell, and a compensating TA value of the first NTN cell.

In some embodiments of the present disclosure, the service link RTT value is determined from a GNSS position of the terminal device and ephemeris information of a satellite; and/or the common TA value is obtained from a system broadcast message; and/or the compensating TA value is obtained from a system broadcast message.

In some embodiments of the present disclosure, the method is applied to carrier aggregation CA between a TN and an NTN, with the PCell, the SCell, or the PSCell being the first NTN cell.

In some embodiments of the present disclosure, the determining unit 310 is specifically configured to determine the first offset based on an estimated TA value of a second NTN cell and an estimated TA value of a third NTN cell.

In some embodiments of the present disclosure, the determining unit 310 is specifically configured to determine half of a sum of the TA value of the second NTN cell and the TA value of the third NTN cell as the first offset.

In some embodiments of the present disclosure, the TA value of the second NTN cell is a sum of a service link RTT value of the second NTN cell and a common TA of the second NTN cell; and/or the TA value of the third NTN cell is a sum of a service link RTT value of the third NTN cell and a common TA of the third NTN cell.

In some embodiments of the present disclosure, the service link RTT value is determined from a GNSS position of the terminal device and ephemeris information of a satellite; and/or the common TA value is obtained from a system broadcast message.

In some embodiments of the present disclosure, the determining unit 310 is specifically configured to determine the first offset based on an RTT value of a second NTN cell and an RTT value of a third NTN cell.

In some embodiments of the present disclosure, the determining unit 310 is specifically configured to determine half of a sum of the RTT value of the second NTN cell and the RTT value of the third NTN cell as the first offset.

In some embodiments of the present disclosure, the RTT value of the second NTN cell is a sum of a service link RTT value of the second NTN cell and a feeder link RTT value of the second NTN cell; and/or the RTT value of the third NTN cell is a sum of a service link RTT value of the third NTN cell and a feeder link RTT value of the third NTN cell.

In some embodiments of the present disclosure, the service link RTT value is determined from a Global Navigation Satellite System, GNSS, position of the terminal device and ephemeris information of a satellite; and/or the feeder link RTT value is obtained from a system broadcast message.

In some embodiments of the present disclosure, the RTT value of the second NTN cell is a sum of a service link RTT value of the second NTN cell, a common TA value of the second NTN cell, and a compensating TA value of the second NTN cell; and/or the RTT value of the third NTN cell is a sum of a service link RTT value of the third NTN cell, a common TA value of the third NTN cell, and a compensating TA value of the third NTN cell.

In some embodiments of the present disclosure, the service link RTT value is determined from a Global Navigation Satellite System, GNSS, position of the terminal device and ephemeris information of a satellite; and/or the common TA value is obtained from a system broadcast message; and/or the compensating TA value is obtained from a system broadcast message.

In some embodiments of the present disclosure, the method is applied to CA between NTNs. The PCell or the PSCell is the second NTN cell, and the SCell is the third NTN cell.

It should be understood that the apparatus embodiments and the method embodiments may correspond to each other and similar descriptions may refer to method embodiments. In particular, the terminal device 300 shown in FIG. 16 may correspond to a corresponding entity in the method 200 for executing the embodiments of the present disclosure. The foregoing and other operations and/or functions of each unit in the terminal device 300 are used for implementing corresponding flows in the method in FIG. 13, which are not described here for brevity.

The communication device of the embodiments of the present disclosure is described above from the perspective of functional modules in combination with the drawings. It should be understood that the functional modules may be implemented in hardware, may be implemented by instructions in software, or may be implemented by a combination of hardware and software modules.

In particular, the steps of the method embodiments in the embodiments of the present disclosure may be accomplished by integrated logic circuitry of hardware in the processor and/or instructions in the form of software. The steps of the method disclosed in combination with the embodiment of the present disclosure can be directly implemented as the execution of the hardware decoding processor or the combination of the hardware and software modules in the decoding processor.

Optionally, the software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

For example, the processing unit and the communication unit referred to above may be implemented by a processor and a transceiver respectively.

Figure 17:
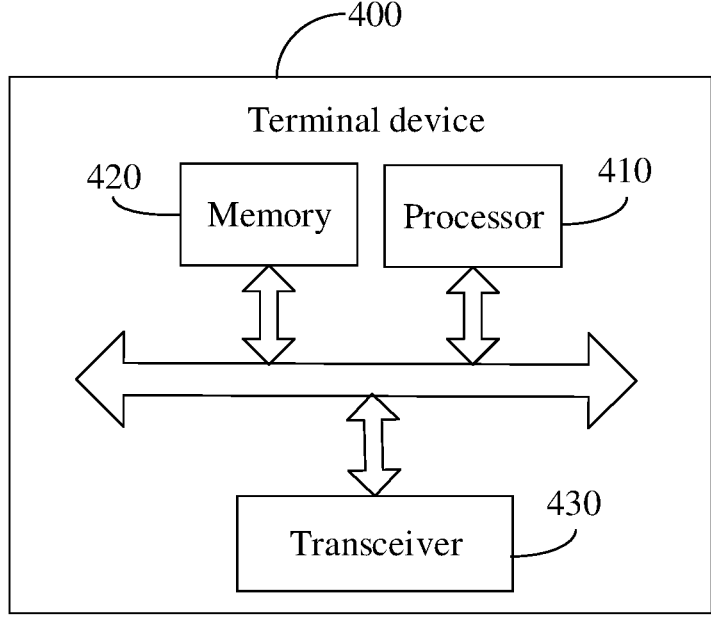

FIG. 17 is a schematic structural diagram of a terminal device 400 according to an embodiment of the present disclosure.

As shown in FIG. 17 the terminal device 400 may include a processor 410.

The processor 410 may execute the computer program stored in the memory to perform the method according to an embodiment of the present disclosure.

Referring further to FIG. 17, the terminal device 400 may also include a memory 420.

The memory 420 may be configured to store indication information and may also be configured to store codes, instructions, and the like executed by the processor 410. The processor 410 may invoke and execute a computer program stored in the memory 420 to implement the method according to an embodiment of the present disclosure. The memory 420 may be a separate device independent of the processor 410 or may be integrated within the processor 410.

Referring further to FIG. 17, the terminal device 400 may also include a transceiver 430.

The processor 410 may control the transceiver 430 to communicate with other devices and in particular may transmit information or data to or receive information or data transmitted by other devices. The transceiver 430 may include a transmitter and a receiver. The transceiver 430 may further include one or more antennas.

It should be understood that the various components in the terminal device 400 are connected through a bus system. In addition to a data bus, the bus system further includes a power bus, a control bus, and a status signal bus.

It should also be understood that the terminal device 400 may be a terminal device according to an embodiment of the present disclosure, and the terminal device 400 may implement corresponding processes implemented by the terminal device in each method of the embodiment of the present disclosure. That is, the terminal device 400 of the embodiment of the present disclosure may correspond to the terminal device 300 of the embodiment of the present disclosure, and may correspond to a corresponding entity in execution of the method 200 according to the embodiment of the present disclosure, which will not be repeated here for the sake of brevity.

In addition, the embodiment of the present disclosure also provides a chip.

For example, the chip may be an integrated circuit chip having signal processing capabilities that may implement or perform the method, the steps, and the logic diagrams disclosed in embodiments of the present disclosure. The chip may also be referred to as a system-level chip, a system-chip, a chip system, or a system-on-chip. Optionally, the chip can be applied to various communication devices so that the communication devices provided with the chip may perform the method, the steps, and the logic block diagrams disclosed in embodiments of the present disclosure.

Figure 18:
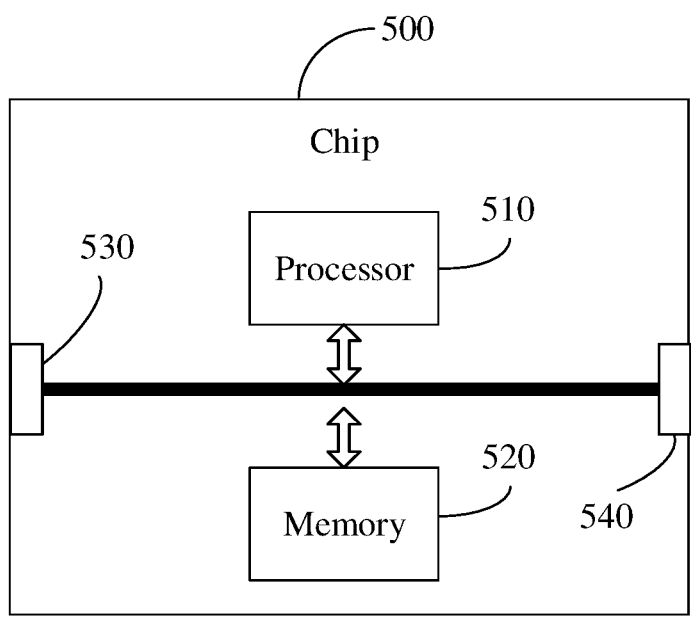
FIG. 18 is a schematic block diagram of a chip according to an embodiment of the present disclosure.

FIG. 18 is a schematic structural diagram of a chip 500 according to an embodiment of the present disclosure.

As shown in FIG. 18, the chip 500 includes a processor 510.

The processor 510 may invoke and execute a computer program stored in the memory to implement the method according to an embodiment of the present disclosure.

Referring further to FIG. 18, the chip 500 may also include a memory 520.

The processor 510 may invoke and execute a computer program stored in the memory 520 to implement the method according to an embodiment of the present disclosure. The memory 520 may be configured to store indication information and may also be configured to store code instructions and the like executed by the processor 510. The memory 520 may be a separate device independent of processor 510 or may be integrated within the processor 510.

Referring further to FIG. 18, the chip 500 may also include an input interface 530.

The processor 510 may control the input interface 530 to communicate with other devices or chips and in particular may obtain information or data transmitted by other devices or chips.

Referring further to FIG. 18, the chip 500 may also include an output interface 540.

The processor 510 may control the output interface 540 to communicate with other devices or chips and in particular may output information or data to other devices or chips.

It should be understood that the chip 500 may be applied to the network device according to the embodiment of the present disclosure, and the chip may implement the corresponding flow implemented by the network device in the respective methods of the embodiment of the present disclosure, and may also implement the corresponding flow implemented by the terminal device in the respective methods of the embodiment of the present disclosure, which will not be repeated here for the sake of brevity.

It should also be understood that the various components in the chip 500 are connected by a bus system. In addition to a data bus, the bus system further includes a power bus a control bus and a status signal bus.

The processor mentioned above may include but are not limited to a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component, and the like.

The processor may be configured to implement or perform the method, the steps, and the logic diagrams disclosed in embodiments of the present disclosure. The steps of the method disclosed in combination with the embodiment of the present disclosure can be directly implemented as the execution of the hardware decoding processor or the combined execution of the hardware and software modules in the decoding processor. The software module may be located in random access memory, flash memory, read only memory, programmable read only memory, or erasable programmable memory, registers and other storage media mature in the art. The storage medium is located in the memory, and the processor reads the information in the memory and completes the steps of the method in combination with its hardware.

The memory mentioned above includes but is not limited to a volatile memory or a non-volatile memory. The non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As illustrative, rather than limiting, examples, many forms of RAMs are available, including Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), and Direct Rambus RAM (DR RAM).

It should be noted that the memory described herein is intended to include these and any other suitable types of memory.

The embodiment of the present disclosure also provides a computer readable storage medium for storing computer programs. The computer-readable storage medium stores one or more programs including instructions that, when executed by a portable electronic device including a plurality of application programs, enable the portable electronic device to perform the method according to the method embodiment described above. Optionally, the computer-readable storage medium can be applied to the mobile terminal/terminal device according to an embodiment of the present disclosure, and the computer program causes the computer to execute the corresponding flow in the method according to the embodiment of the present disclosure implemented by the mobile terminal/terminal device, which will not be repeated here for the sake of brevity.

The embodiment of the present disclosure also provides a computer program product including a computer program. Optionally, the computer program product may be applied to the mobile terminal/terminal device according to the embodiment of the present disclosure, and the computer program causes the computer to execute the corresponding flow in the method according to the embodiment of the present disclosure implemented by the mobile terminal/terminal device, which is not repeated here for the sake of brevity.

The embodiment of the present disclosure also provides a computer program. When the computer program is executed by the computer, the computer is enabled to execute the method according to the method embodiment described above. Optionally, the computer program can be applied to the mobile terminal/terminal device according to the embodiment of the present disclosure, and when the computer program is run on the computer, the computer executes the corresponding flow in the method according to the embodiment of the present disclosure implemented by the mobile terminal/terminal device, which will not be repeated here for the sake of brevity.

In addition, an embodiment of the present disclosure also provides a communication system, which may include the above-mentioned terminal device and network device to form the communication system as shown in FIG. 1, which will not be repeated here for the sake of brevity. It should be noted that the term "system" used herein can also be referred to as "network management architecture" or "network system".

It should also be understood that terms used in the present disclosure are only for a purpose of describing specific embodiments, and are not intended to limit the present disclosure. Singular forms of "a", "an", "said" and "the" used in the embodiments of the present disclosure and the appended claims also include plural forms, unless the context clearly indicates other meanings.

Those skilled in the art will appreciate that the various example units and algorithm steps described in connection with the embodiments disclosed herein can be implemented in electronic hardware or a combination of computer software and electronic hardware. Whether these functions are performed in hardware or software depends on the specific application and design constraints of the technical solution. Those skilled in the art may use different methods for each particular application to implement the described functionality, but such implementation should not be considered beyond the scope of the embodiments of the present disclosure.

When the function is implemented in the form of a software functional unit and sold or used as a standalone product, it can be stored in a computer readable storage medium. Based on this understanding, all or part of the technical solutions according to the embodiments of the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, apparatuses, and methods may be implemented in other ways. For example, the apparatus embodiments described above are illustrative only. For example, the divisions of the units, modules, and components are only divisions based on logical functions, and there may be other divisions in actual implementations. For example, more than one unit or component may be combined or integrated into another system, or some units, modules, and components can be ignored or omitted. For example, the units/modules/components described above as separation/display means may or may not be physically separated, i.e. may be located in one place, or may be distributed over a plurality of network elements. Some or all of the units/modules/components may be selected according to actual needs to achieve the object of the embodiment of the present disclosure.

While the specific embodiments of the present disclosure have been described above, the scope of the present disclosure is not limited to these embodiments. Various variants and alternatives can be made by those skilled in the art without departing from the scope of the present disclosure. These variants and alternatives are to be encompassed by the scope of present disclosure as defined by the claims as attached.

What is claimed is:

1. A wireless communication method, comprising:
determining, by a terminal device, a first offset for a Random Access Response, (RAR) window;
initiating, by the terminal device, the RAR window after the first offset following transmission of a preamble on a Secondary Cell (SCell); and
monitoring, by the terminal device, an RAR in the RAR window on a Primary Cell (PCell) or a Primary Secondary Cell (PSCell);
wherein said determining, by the terminal device, the first offset for the RAR window comprises:
determining, by the terminal device, half of a Timing Advance (TA) value of a first Non-Terrestrial Network (NTN) cell or half of a Round Trip Time (RTT) value of the first NTN cell as the first offset; or
determining, by the terminal device, the first offset based on an estimated TA value of a second NTN cell and an estimated TA value of a third NTN cell, or based on an RTT value of the second NTN cell and an RTT value of the third NTN cell.

2. The method according to claim 1, wherein the TA value of the first NTN cell is a sum of a service link RTT value of the first NTN cell and a common TA of the first NTN cell, or
wherein the RTT value of the first NTN cell is a sum of a service link RTT value of the first NTN cell and a feeder link RTT value of the first NTN cell, or
the RTT value of the first NTN cell is a sum of a service link RTT value of the first NTN cell, a common TA value of the first NTN cell, and a compensating TA value of the first NTN cell.

3. The method according to claim 2, wherein
the service link RTT value is determined from a Global Navigation Satellite System (GNSS) position of the terminal device and ephemeris information of a satellite;
the common TA value is obtained from a system broadcast message;
the feeder link RTT value is obtained from a system broadcast message; and/or
the compensating TA value is obtained from a system broadcast message.

4. The method according to claim 1, wherein the method is applied to Carrier Aggregation (CA) between a Terrestrial Network (TN) and an NTN, wherein the PCell, the SCell, or the PSCell is the first NTN cell.

5. The method according to claim 1, wherein said determining, by the terminal device, the first offset based on the estimated TA value of the second NTN cell and the estimated TA value of the third NTN cell comprises:
determining, by the terminal device, half of a sum of a TA value of the second NTN cell and a TA value of the third NTN cell or half of a sum of the RTT value of the second NTN cell and the RTT value of the third NTN cell as the first offset.

6. The method according to claim 5, wherein
the TA value of the second NTN cell is a sum of a service link RTT value of the second NTN cell and a common TA of the second NTN cell; and/or
the TA value of the third NTN cell is a sum of a service link RTT value of the third NTN cell and a common TA of the third NTN cell, or
wherein:
the RTT value of the second NTN cell is a sum of a service link RTT value of the second NTN cell and a feeder link RTT value of the second NTN cell; and/or
the RTT value of the third NTN cell is a sum of a service link RTT value of the third NTN cell and a feeder link RTT value of the third NTN cell, or
the RTT value of the second NTN cell is a sum of a service link RTT value of the second NTN cell, a common TA value of the second NTN cell, and a compensating TA value of the second NTN cell; and/or
the RTT value of the third NTN cell is a sum of a service link RTT value of the third NTN cell, a common TA value of the third NTN cell, and a compensating TA value of the third NTN cell.

7. The method according to claim 6, wherein
the service link RTT value is determined from a GNSS position of the terminal device and ephemeris information of a satellite;
the common TA value is obtained from a system broadcast message;
the feeder link RTT value is obtained from a system broadcast message; and/or
the compensating TA value is obtained from a system broadcast message.

8. The method according to claim 1, wherein the method is further applied to CA between an NTN and an NTN, wherein the PCell or the PSCell is the second NTN cell, and the SCell is the third NTN cell.

9. A terminal device, comprising a processor and a memory, wherein the memory is configured to store a computer program, and the processor is configured to invoke and execute the computer program stored in the memory to perform operations comprising:
determining, by the terminal device, a first offset for a Random Access Response, (RAR) window;

initiating, by the terminal device, the RAR window after the first offset following transmission of a preamble on a Secondary Cell (SCell); and monitoring, by the terminal device, an RAR in the RAR window on a Primary Cell, (PCell) or a Primary Secondary Cell (PSCell);

wherein said determining, by the terminal device, the first offset for the RAR window comprises:

determining, by the terminal device, half of a Timing Advance (TA) value of a first Non-Terrestrial Network (NTN) cell or half of a Round Trip Time (RTT) value of the first NTN cell as the first offset; or determining, by the terminal device, the first offset based on an estimated TA value of a second NTN cell and an estimated TA value of a third NTN cell, or based on an RTT value of the second NTN cell and an RTT value of the third NTN cell.

10. The terminal device according to claim 9, wherein the TA value of the first NTN cell is a sum of a service link RTT value of the first NTN cell and a common TA of the first NTN cell, or wherein the RTT value of the first NTN cell is a sum of a service link RTT value of the first NTN cell and a feeder link RTT value of the first NTN cell, or the RTT value of the first NTN cell is a sum of a service link RTT value of the first NTN cell, a common TA value of the first NTN cell, and a compensating TA value of the first NTN cell.

11. The terminal device according to claim 10, wherein the service link RTT value is determined from a GNSS position of the terminal device and ephemeris information of a satellite;

the common TA value is obtained from a system broadcast message;

the feeder link RTT value is obtained from a system broadcast message; and/or the compensating TA value is obtained from a system broadcast message.

12. The terminal device according to claim 9, wherein the method is applied to Carrier Aggregation (CA) between a Terrestrial Network (TN) and an NTN, wherein the PCell, the SCell, or the PSCell is the first NTN cell.

13. The terminal device according to claim 9, wherein said determining, by the terminal device, the first offset based on the estimated TA value of the second NTN cell and the estimated TA value of the third NTN cell comprises:

determining, by the terminal device, half of a sum of a TA value of the second NTN cell and a TA value of the third NTN cell or half of a sum of the RTT value of the second NTN cell and the RTT value of the third NTN cell as the first offset.

14. The terminal device according to claim 13, wherein the TA value of the second NTN cell is a sum of a service link RTT value of the second NTN cell and a common TA of the second NTN cell; and/or the TA value of the third NTN cell is a sum of a service link RTT value of the third NTN cell and a common TA of the third NTN cell, or wherein:

the RTT value of the second NTN cell is a sum of a service link RTT value of the second NTN cell and a feeder link RTT value of the second NTN cell; and/or the RTT value of the third NTN cell is a sum of a service link RTT value of the third NTN cell and a feeder link RTT value of the third NTN cell, or the RTT value of the second NTN cell is a sum of a service link RTT value of the second NTN cell, a common TA value of the second NTN cell, and a compensating TA value of the second NTN cell; and/or the RTT value of the third NTN cell is a sum of a service link RTT value of the third NTN cell, a common TA value of the third NTN cell, and a compensating TA value of the third NTN cell.

15. The terminal device according to claim 14, wherein the service link RTT value is determined from a GNSS position of the terminal device and ephemeris information of a satellite;

the common TA value is obtained from a system broadcast message;

the feeder link RTT value is obtained from a system broadcast message; and/or the compensating TA value is obtained from a system broadcast message.

16. The terminal device according to claim 9, wherein the method is further applied to CA between an NTN and an NTN, wherein the PCell or the PSCell is the second NTN cell, and the SCell is the third NTN cell.

* * * * *